United States Patent [19]

Östling et al.

[11] 4,226,571
[45] Oct. 7, 1980

[54] PRESSURE OIL INJECTOR

[75] Inventors: Sture Östling; Stig Persson, both of Katrineholm, Sweden

[73] Assignee: Aktiebolaget SKF, Goteborg, Sweden

[21] Appl. No.: 948,419

[22] Filed: Oct. 4, 1978

[30] Foreign Application Priority Data

1977 [SE] Sweden .............................. 7711968

[51] Int. Cl.³ .......................................... F04B 21/00
[52] U.S. Cl. .................................... 417/63; 417/234; 417/360
[58] Field of Search ................ 417/63, 234, 360, 374; 285/61, 156, 355, 390

[56] References Cited

U.S. PATENT DOCUMENTS

| 538,634 | 4/1895 | Witham | 285/355 X |
|---|---|---|---|
| 566,154 | 8/1896 | Eynon | 417/63 |
| 938,522 | 11/1909 | Swain | 417/63 |
| 1,394,017 | 10/1921 | Jackson | 417/234 |
| 2,694,022 | 11/1954 | Schreiner | 285/355 X |

FOREIGN PATENT DOCUMENTS 115112 10/1945 Sweden ...................... 417/63

Primary Examiner—Carlton R. Croyle
Assistant Examiner—Edward Look
Attorney, Agent, or Firm—Eugene E. Renz, Jr.

[57] ABSTRACT

A pressure oil injector assembly characterized by novel features of construction and arrangement providing easy and quick mounting and dismounting and which has good transportability comprising an attachment and connecting member with connections for a pump housing of a pressure medium pump and a pressure pipe. The mounting arrangement is such that the high pressure side of the pump in in communication with the pressure pipe. The pump housing and pressure pipe are connected to the attachment and connecting member by means of threaded dowels which seat in threaded bores in the attachment and connecting member which are opposed to each other and spaced by a chamber or aperture. In the principal embodiment, a manometer seats in the aperture with a certain amount of play and is supported in a firm position between the inner terminal ends of the dowels. Accordingly, the angular position of one of the dowels and therefore, also the angular position of the pump can be freely chosen in relation to the attachment and connecting member and the parts including the manometer can be firmly connected in a leakproof manner simply by tightening the other dowel.

8 Claims, 4 Drawing Figures

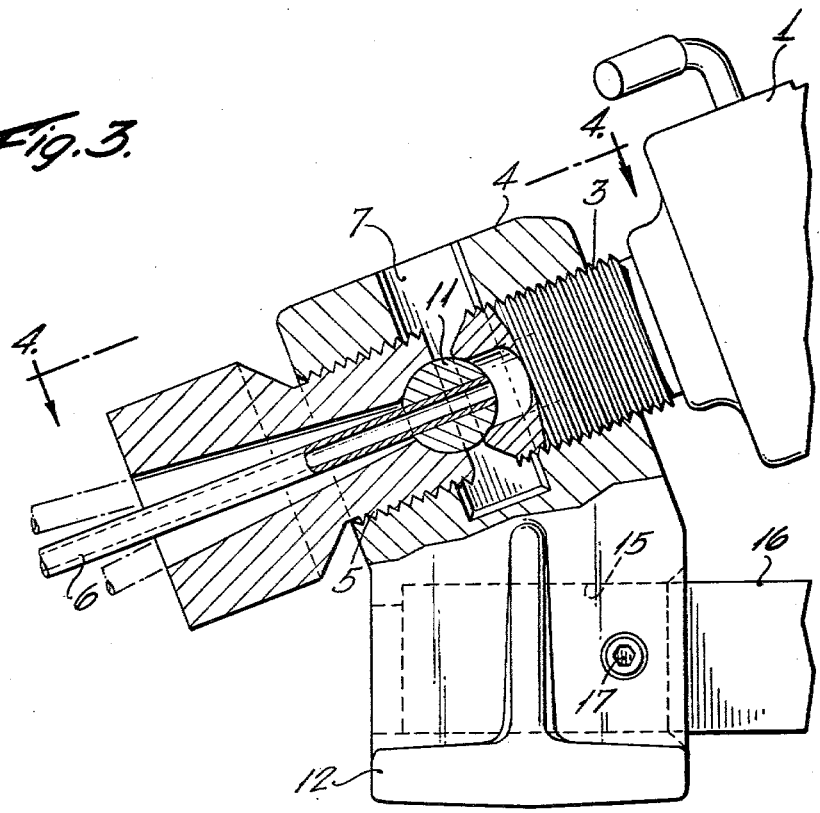
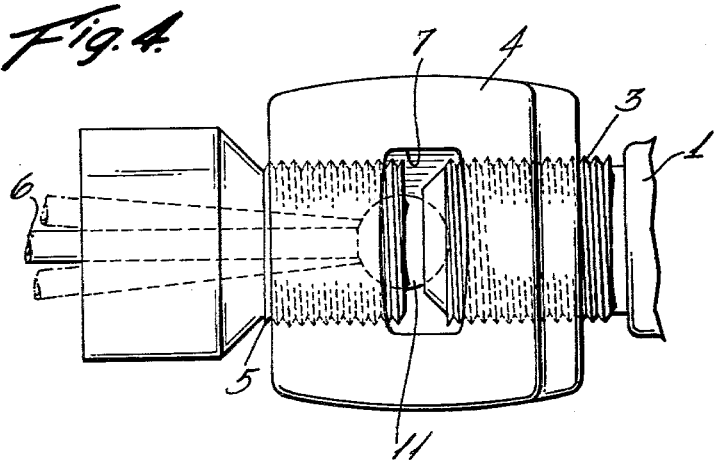

PRESSURE OIL INJECTOR

BACKGROUND OF THE INVENTION

The present invention refers to a pressure oil injector of the type specified in the preamble in the accompanying claim 1. The injector is primarily intended for use together with hydraulic mounting and dismounting devices, e.g. shaft couplings which are mounted and dismounted by means of pressure oil. It is important that an injector for such purposes is easy to transport and to handle as it shall be used in several different places where the accessible space varies and a swift manoeuvring is furthermore desired as the device is generally used at servicing and repair or production machines, the downtime of which must be minimized.

Earlier known pressure oil injectors are generally provided with a threaded dowel, which fits into a correspondingly threaded bore in e.g. the sleeve of a shaft coupling, thus that the injector can be screwed onto the sleeve, and the oil channels of the sleeve are connected with the high pressure portion of the injector via a channel in said dowel and said threaded bore. It can thereby happen that the threaded bore has such a position that it is difficult to mount and operate the injector in the accessible space as the entire injector housing must be rotated when the dowel is screwed into the bore and the injector pump is operated via a comparatively long lever. The position of the injector and thereby of the lever of the sleeve is not predetermined and the position can be inconvenient when the dowel of the injector is screwed to the bottom of the bore, which at use always must be the case. Pressure oil injectors provided with particular ducts for connection to the high pressure portion of the pump and for instance to a threaded bore in a sleeve in accordance with the above is also known. These can be placed more freely in relation to the bore of the sleeve but they should also be provided with attachment means for their fitting against a firm base for facilitating the pump strokes of the lever. A convenient firm base which allows fitting of the attachment member is not always available. It is furthermore often convenient that the injector is provided with a manometer for reading the oil pressure in the high pressure portion. The manometer and the pump housing of the injector are oftenly screwed into one hole each in the attachment member, which holes communicate with the high pressure pipe and thereby it can be difficult to connect the parts thus that the manometer easily can be read off at the same time as the pump lever easily can be operated as the positions of the manometer and the pump housing when entirely screwed into their associated bores in the attachment member are not predetermined, whereby it for instance can happen that the back of the manometer will be turned against the direction from which the lever is operated when the injector is mounted. The purpose of the present invention is to propose a pressure oil injector, which is easy to transport and operate in different positions. The characterizing features of the invention are set out in the accompanying claims.

DESCRIPTION OF THE DRAWINGS

The different parts of the injector are according to the invention dismountable for ascertaining a good transportability and dismounting and mounting can be made easily and swiftly. The invention will hereinafter be further described with reference to the accompanying drawing, wherein;

FIG. 3 is a side elevational view partly in section of a modified version of the pressure oil injector assembly of the present invention; and FIG. 4 is a top plan view of the embodiment shown in FIG. 3.

DESCRIPTION OF THE PREFERRED EMBODIMENTS

Figure 1:
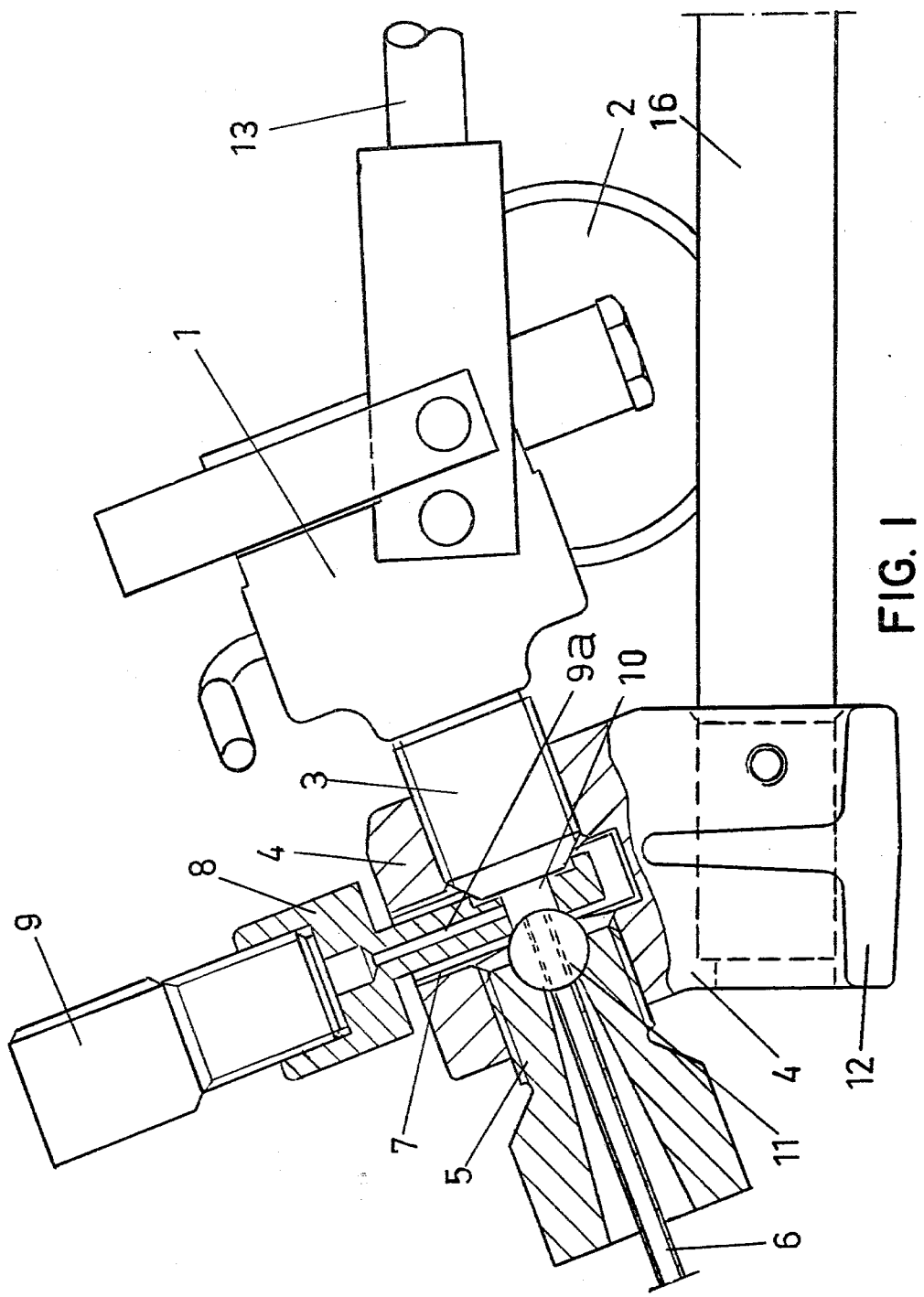
FIG. 1 is a side elevational view partly in section of a pressure oil injector assembly in accordance with the present invention.
Figure 2:
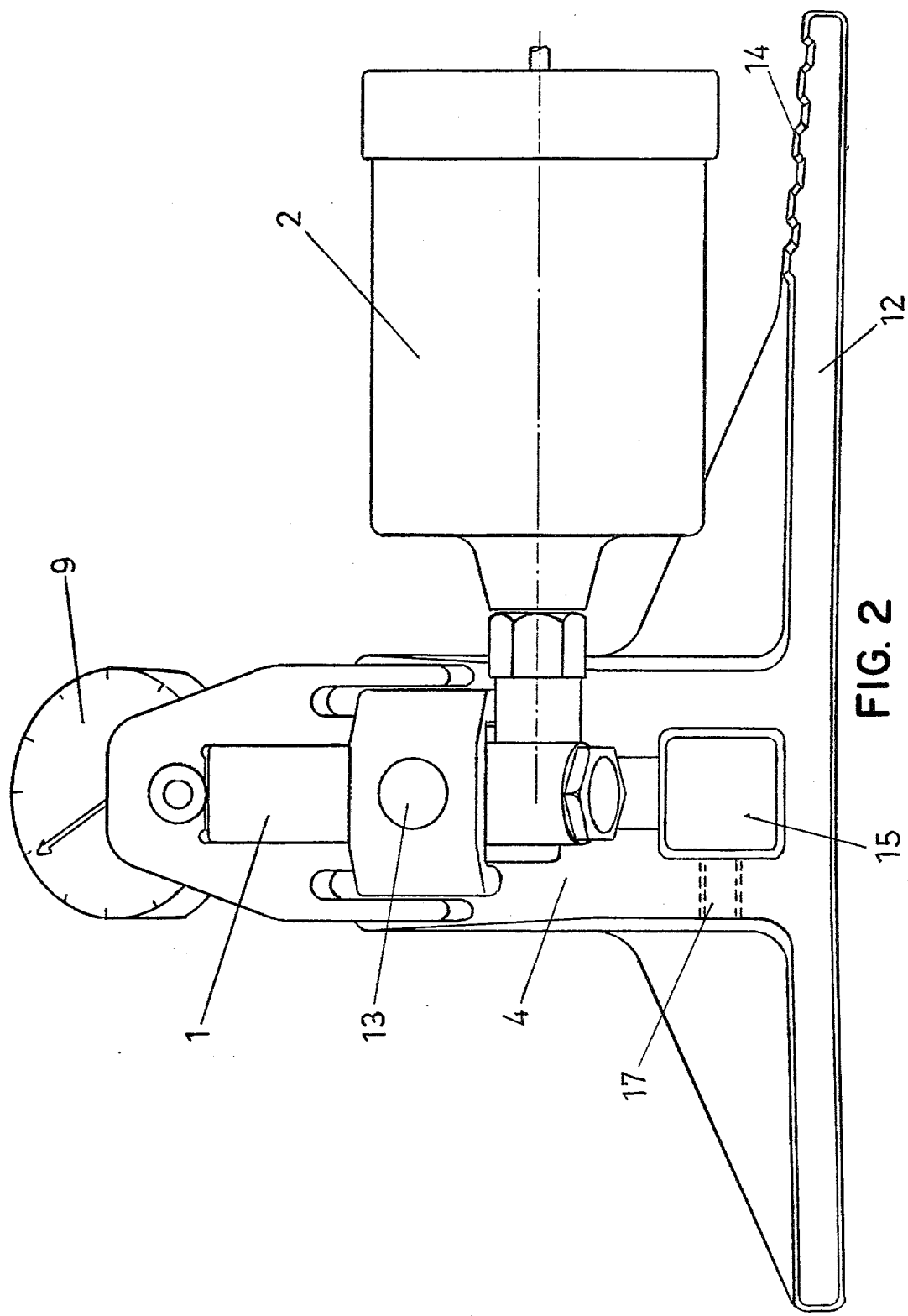
FIG. 2 is a front elevational view of the pressure oil injector assembly.

The pressure oil injector incorporates a pump 1 of a known type, which is connectable to an oil reservoir 2. The high pressure part of the pump opens in the end of a threaded dowel 3 on the pump housing. The dowel is insertable into a correspondingly threaded bore in an attachment and connecting member 4. A connecting nozzle with a threaded dowel 5 for one end of a pressure conduit formed as a high pressure pipe 6 is arranged in a second threaded bore in the attachment and connecting member 4. The other end of the connecting nozzle can be connected to the element which shall be fed with a pressure medium. The bores for the dowels 3 and 5 are opposed relative to each other and open in an aperture 7 in the attachment and connecting member 4. A member 8 which connects to a manometer 9 has a portion which is insertable into the aperture 7. The member 8 can be detachable from or be firmly integrated with the manometer 9. The dowels 3 and 5 can be screwed so far into the associated bores that the member 8 can be squeezed between the ends of the dowels. Channels 9a, 10 are arranged in such a manner in member 8 that the high pressure part of the pump 1, the manometer 9 and the pressure pipe 6 are communicating so that the manometer will show the pressure in the pressure pipe when the member 8 is squeezed between the dowels 4 and 5. The member 8 is arranged with play in aperture 7 thus that it can be displaced a distance in parallel with the axes of the dowels 3, 5. The aperture has preferably a rectangular cross section, i.e. the opening of the aperture is rectangular as seen from above and the portion of the member 8 which is intended to be introduced into the aperture has a parallel-epipedic form. The high pressure pipe 6 is in the embodiment shown connected to the channel 10 via a ball 11, which is provided with a diametrical bore and which ball engages spherical depressions in the end of the dowel 5 and the orifice of the channel 10. The dowel 5 can thereby be easily screwed into its bore so hard that a leak proof connection is obtained at both ends of the channel 10. The dowel 3 is always screwed in so far that it projects a distance into the aperture 7 and as a member has a play in the aperture it is possible to screw in the dowel 3 so far that the position of the pump portion 1 can always be chosen as wanted in relation to the attachment and connection member 4. After the dowel 3 has been screwed to its desired position and the member 8 is introduced in the aperture 7 the dowel 5 is thus screwed in so far that a leak proof and stable connection is obtained thereby that the member 8 is squeezed between the ball 11 and the end of the dowel 3.

The attachment and connecting member 4 is preferably provided with a support 12, whereby the injector can be placed steadily on a base. It can be locked to the base, whereby the pumping easily can take place with the lever 13. The injector can for instance be attached to a table or the like as the attachment and connecting member is provided with a hole 15, in which e.g. one shank of a screw clamp can be inserted. A handle 16 can also be inserted in the hole 15 where it can be secured by means of the stop screw 17. The injector can thereby be operated without being fixed to a rigid base. The handle 16 or some similiar bar can also act as a extra support when the injector is placed on a floor or the like. The connecting member can also be fitted to a screw vice or the like by being clamped over the longitudinal sides of the support 12.

It is obvious that the injector according to the invention can be easily dismounted and assembled and that the manometer 9 always will have the correct position in relation to the supports 12, 16 and that the lever 13 always can be given a desired direction in relation to the other parts of the injector, e.g. the handle 16. For facilitating reading and operation of the manometer 9 the attachment and connecting device is preferably designed in such a manner that the reading scale of the manometer 9 and the pump lever 13 can be directed obliquily upwards when the injector is placed on a horizontal base.

The pressure oil injector can also be used without the member 8, when the manometer is not necessary. In this case the dowel 3 and the dowel 5 are screwed in as far into the connecting member 4 that the ball 11 presses against the tapering part of the dowel 3 as shown in FIGS. 3 and 4.

We claim:

1. A pressure oil injector assembly comprising an attachment and connecting member (4) having connecting means for a pump housing of a pressure medium pump (1) and a pressure pipe (6), the high pressure part of the pump being in communication with the pressure pipe, means for connecting the pump housing and the pressure pipe to the attachment and connecting member including threaded dowels (3, 5) which engage in threaded bores in said attachment and connecting member, said bores being opposed to each other, an insertable member adapted to seat in an aperture in said attachment and connecting member located between said threaded bores, said dowels adapted to be threaded toward one another in said bores to lock said insertable member therebetween, said threaded bores being arranged in a predetermined manner so that said one dowel connected to said pump may be selectively positioned in a predetermined angular position when the dowels lock said insertable member therebetween whereby the angular position of the pump can be selectively chosen in relation to said attachment and connecting member.

2. A pressure oil injector assembly as claimed in claim 1 including a manometer (9) wherein said insertable member includes a manometer in fluid communication with said pressure pipe and means defining a clearance between said insertable member and aperture whereby the inner terminal ends of the dowels project into the aperture to engage said insertable member whereby said insertable member (8) is arranged in said aperture with a play essentially in parallel with the axes of the dowels.

3. A pressure oil injector assembly as claimed in claim 2 wherein the insertable member connected to the manometer is provided with communicating channels (9a, 10), one of said channels connected to a pressure sensor of the manometer and to an opening in each of the surfaces against which the threaded dowels abut and wherein the inner terminal end of each dowel is provided with a corresponding opening for connection to the pressure pipe and to the high pressure part of the pump respectively.

4. A pressure oil injector assembly as claimed in claim 3 wherein said pressure pipe mounts a ball at the inner terminal end of the dowel (5) which projects beyond the inner terminal end of said dowel and seats against the conical tip of the dowel (3).

5. A pressure oil injector assembly as claimed in claim 1 wherein the attachment and connecting member includes a support (12).

6. A pressure oil injector assembly as claimed in claim 5 wherein the axes of the threaded bores in the attachment connecting member form an angle to the support.

7. A pressure oil injector assembly as claimed in claim 1 wherein said aperture is of generally rectangular cross section and the part of the insertable member engaging in the aperture is shaped mainly in the form of a parallelepiped.

8. A pressure oil injector assembly comprising an attachment and connecting member (4) having connecting means for a pump housing of a pressure medium pump (1) and a pressure pipe (6), the high pressure part of the pump being in communication with the pressure pipe, means for connecting the pump housing and the pressure pipe to the attachment and connecting member including threaded dowels (3, 5) which engage in threaded bores in said attachment and connecting member, said threaded bores being opposed to each other whereby the inner terminal ends of said dowels may be engaged to provide a seal therebetween, the angular position of said one dowel connected to said pump being selectively varied in the locked position whereby the angular posotion of the pump can be selectively chosen in relation to said attachment and connecting member.

* * * * *